(12) United States Patent
Bauer et al.

(10) Patent No.: US 9,809,248 B2
(45) Date of Patent: Nov. 7, 2017

(54) STEERING SYSTEM

(75) Inventors: Thomas Bauer, Sydals (DK); Soeren Moeller Hansen, Soenderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 1094 days.

(21) Appl. No.: 12/063,886

(22) PCT Filed: Aug. 17, 2006

(86) PCT No.: PCT/DK2006/000450
§ 371 (c)(1),
(2), (4) Date: Jul. 3, 2008

(87) PCT Pub. No.: WO2007/019862
PCT Pub. Date: Feb. 22, 2007

(65) Prior Publication Data
US 2009/0166124 A1    Jul. 2, 2009

(30) Foreign Application Priority Data
Aug. 18, 2005   (DK) .................................. 2005 01164

(51) Int. Cl.
*B62D 6/00*    (2006.01)
*B63H 25/02*   (2006.01)
(Continued)

(52) U.S. Cl.
CPC ............ *B62D 6/001* (2013.01); *B62D 6/002* (2013.01); *B63H 25/02* (2013.01); *E02F 9/0841* (2013.01);
(Continued)

(58) Field of Classification Search
CPC ...... B62D 5/04; B62D 5/0466; B62D 5/0472; B62D 6/002; B62D 6/001; E02F 9/0841; E02F 9/2087
(Continued)

(56) References Cited

U.S. PATENT DOCUMENTS 4,574,905 A * 3/1986 Asano .................... B62D 6/007
                                              180/422
5,934,406 A * 8/1999 Dvorak et al. ................ 180/442
(Continued)

FOREIGN PATENT DOCUMENTS

DE       3616041 A1    11/1986
DE       4301012 A1     7/1994
(Continued)

OTHER PUBLICATIONS

Search Report for Serial No. PCT/DK2006/000450 dated Oct. 27, 2006.

*Primary Examiner* — Anne Marie Boehler
(74) *Attorney, Agent, or Firm* — McCormick, Paulding & Huber LLP

(57) ABSTRACT

The invention provides a steering system comprising a controlled element which is movable in a neutral area comprising a neutral position and in areas on opposite sides of the neutral area based on a steering input and a handle for requesting a desired position for the controlled element. The handle is movable between set-points in a center zone comprising a center set-point and set-points on opposite sides of the center zone. Furthermore, a steering unit is arranged to receive set-points from the handle, to determine a corresponding controlled position of the controlled element, and to move the controlled element to said controlled position. In order to prevent or reduce jerks, the steering unit is adapted to vary a speed by which the controlled element is moved to the controlled position. The speed is variable in dependence of the received set-point.

11 Claims, 3 Drawing Sheets

(51) Int. Cl.
*E02F 9/08* (2006.01)
*E02F 9/20* (2006.01)

(52) U.S. Cl.
CPC ...... *E02F 9/2087* (2013.01); *B63H 2025/024* (2013.01)

(58) Field of Classification Search
USPC ..... 180/418, 420, 421, 422, 446; 701/41–44
See application file for complete search history.

(56) References Cited

U.S. PATENT DOCUMENTS

| | | | |
|---|---|---|---|
| 5,944,137 A * | 8/1999 | Moser et al. | 180/446 |
| 6,173,221 B1 * | 1/2001 | Boehringen et al. | 701/41 |
| 6,311,799 B1 * | 11/2001 | Kaji | 180/422 |
| 6,668,967 B2 | 12/2003 | Sorensen et al. | |
| 7,624,836 B2 * | 12/2009 | Huang et al. | 180/423 |
| 2001/0004952 A1 | 6/2001 | Sorensen et al. | |
| 2005/0139412 A1 * | 6/2005 | Vigholm | 180/418 |
| 2009/0166124 A1 | 7/2009 | Bauer et al. | |

FOREIGN PATENT DOCUMENTS

| | | |
|---|---|---|
| DE | 198 23 910 A1 | 12/1998 |
| DE | 19963344 C1 | 9/2001 |
| DE | 10117166 A1 | 10/2002 |
| DE | 103 55 933 A1 | 6/2005 |
| DE | 112006002183 T5 | 6/2008 |
| EP | 1112911 A2 | 7/2001 |

\* cited by examiner

STEERING SYSTEM

CROSS REFERENCE TO RELATED APPLICATIONS

This application is entitled to the benefit of and incorporates by reference essential subject matter disclosed in International Patent Application No. PCT/DK2006/000450 filed on Aug. 17, 2006 and Danish Patent Application No. PA 2005 01164 filed Aug. 18, 2005.

FIELD OF THE INVENTION

The present invention relates to a steering system for a mobile machine such as a vehicle or a ship.

BACKGROUND OF THE INVENTION

Vehicles, and in particular off-highway machinery such as wheel loaders, excavators, dozers, articulated vehicles, tractors, harvesters and similar heavy duty machines often operate with hydraulic, electro-hydraulic, and electric steering systems. Typically, the steering system receives a desired input to indicate a desired angular movement of the vehicle. The input could be provided via input means such as a joystick, a steering wheel, or the input could be derived from a GPS system or similar system for positioning and tracking. The input is converted into a signal for an actuator, e.g. a hydraulic cylinder, which moves a steered element, e.g. a wheel of a vehicle or a rudder of a ship. A steering system is disclosed e.g. in U.S. Pat. No. 6,668,967.

In a fully hydraulic steering, the actuator is typically supplied with a hydraulic flow via a steering unit which is connected to the steering input means. The steering unit often comprises a spool which is moved in dependency of the position of the input means. The spool opens or closes a path from a source of a hydraulic fluid under pressure to one out of two hydraulic ports of the actuator. A fluid flow in one of the ports forces the actuator to move in one direction and a fluid flow in the other port forces the actuator in an opposite direction, e.g. right or left. Typically, the input means is a steering wheel or a joystick. The input means is movable between a centre set-point and set-points on opposite sides of the centre set-point, e.g. corresponding to a right turn or a left turn. The steering unit is normally provided to activate the actuator to move in the right direction as long as the input means is to the right of the centre set-point and to move in the left direction as long as the input means is to the left of the centre set-point. In the centre set-point, the actuator is normally stopped, and the steered element is locked in the position where it was when the input means reached the centre set-point. This is sometimes referred to as open loop-steering. Alternatively, the actuator and thereby the steered element returns to a neutral position. Normally, the input means is biased towards the centre set-point which means that the user forces the input means away from the centre set-point, and when the user releases the grip in the joystick or steering wheel or otherwise let go of the input means, the input means returns to the centre set-point. This is sometimes referred to as closed loop-steering.

A change of acceleration, often called jerk, may be uncomfortable for the driver. In particular with respect to articulated vehicles, jerks may occur if the input means is moved to the centre set-point or to a right or left extreme set-point too fast, and to avoid such jerks, systems exist in which the steering unit is adapted to move the spool at a reduced speed. This naturally slows down the steering speed and may be annoying and even unsafe in certain cases.

SUMMARY OF THE INVENTION

Considering the above-mentioned problem with jerks, it is an object of the invention to provide a steering system which reacts faster than the known systems. Accordingly, the invention provides a steering system comprising: a controlled element which is movable in a neutral area comprising a neutral position and in areas on opposite sides of the neutral area based on a steering input, a handle for requesting a desired position of the controlled element, the handle being movable between set-points in a centre zone comprising a centre set-point and set-points on opposite sides of the centre zone, and a steering unit arranged to receive set-points from the handle, and to move the controlled element to a corresponding position, the steering unit being adapted to vary a speed by which the controlled element is moved when the controlled element is moved in the neutral area towards the neutral position.

Since the speed is variable, a slow speed may be chosen for movements which may cause jerks and a faster speed may be chosen whenever required in a specific traffic situation.

The controlled element may be wheels, rudders, articulations, or similar steered elements of a mobile machine such as a vehicle or ship. Alternatively, the controlled element may be a hydraulic component, a magnetic component or similar component for controlling a steered element.

In embodiments where the controlled element is a steered element, the neutral position of the controlled element may correspond to a movement of the mobile machine in a straight forward or straight backward direction.

In particular, the steering unit may be adapted to select at least between a fast down-ramp speed and a slow down-ramp speed by which the controlled element is moved when the controlled element is moved in the neutral area towards the neutral position. For movements away from the neutral position, the steering unit may be adapted to select an up-ramp speed.

In other embodiments where the controlled element is a component for controlling a steered element, the controlled element could be a spool of a hydraulic valve controlling the flow direction to and from an actuator for moving the steered element of the mobile machine. In this case, the neutral position of the controlled element may correspond to a situation wherein the steered element is not actuated and wherein the mobile machine therefore continues along an unchanged path. As an example, the controlled element is a spool of a valve. When the spool is moved to the neutral position, the hydraulic flow to and from the steered element is stopped and the steered element is locked in a fixed position, i.e. open loop-steering. Alternatively, the system may further comprise a control system which may cause the steered element to return to its initial position corresponding to a movement of the mobile machine in a straight forward or straight backward direction when the spool is moved to the neutral position, i.e. closed loop steering.

Movements of the controlled element in the neutral area may correspond to minor movements of the controlled element, whereas movements outside the neutral area may correspond to larger movements of the controlled element.

The handle may be in the form of a joystick, a steering wheel or the like for manual steering of a mobile machine.

Alternatively or additionally, the handle may be controlled by input from a GPS system or similar system for positioning and tracking.

When the handle is moved to a set-point by the operator of the mobile machine, the set-point represents a desired position of the controlled element, and subsequently, the system moves the controlled element. Due to tolerances, faults, etc., the controlled element is not necessarily moved to the desired position but rather to a corresponding controlled position.

When the set-point is the centre set-point, the controlled element is moved essentially to its neutral position. When the set-point is an extreme right position, the controlled element is moved essentially to its extreme right position. Set-points in the centre zone may correspond to minor left or right movements of the controlled element, whereas set-points on opposite sides of the centre zone may correspond to larger left or right movements of the controlled element.

The steering unit could be implemented in a regular CPU system with a data storage from which various speeds may be retrieved. In a hydraulic system, the steering unit may incorporate various valves for controlling hydraulic flow to move the controlled element or it may incorporate various solenoids for moving the controlled element. Other features for moving the controlled element may also be used.

The steering system may further comprise a valve with a housing defining an inlet port connectable to a source of fluid, first and second ports connectable to first and second ports of a pressure operated device, and an outlet port connectable to a tank. The valve may comprise a spool which is movable between valve positions in the housing to provide a variable fluid flow from the source to one of the first and second ports of the device and from the other port to the tank. In this embodiment, the controlled element may be constituted by the spool.

The pressure operated device could be a hydraulic steering cylinder which is attached to the steered element of the mobile machine to move the steered element depending on the flow direction of the fluid. When fluid flows into the first port and out of the second port, the steered element is moved to the right and in the opposite situation, the steered element is moved to the left.

When the controlled element is moved at the fast down-ramp speed, there may only be a minor time delay between the movement of the handle and the movement of the controlled element. This minor time delay may be caused by mechanical inertia, tolerances and the viscosity of the hydraulic fluid which may also delay the movement. When the controlled element is moved at the slow down-ramp speed, the controlled element may be moved with a larger time delay. Thus, the controlled element may slowly return to the neutral position.

When the handle is moved from a set-point on one side of the centre zone to the opposite side of the centre zone, this may correspond to a movement from a larger right movement to a larger left movement of the controlled element (or a reverse movement). This movement indicates that the operator e.g. finds that a quick change of direction is necessary or requires active control of the mobile machine without a delay. In this case, the controlled element may be moved at the fast down-ramp speed until it reaches the neutral position and at the up-ramp speed thereafter, or alternatively, the controlled element is moved at a constant speed through the neutral area. The constant speed may be the fast down-ramp speed.

Jerks often appear when the operator releases the handle, and the handle thereby rapidly returns to the centre zone. In this case, the speed of the movement is unimportant, and the system may therefore be adapted to avoid jerks. Thus, the slow down-ramp speed may be at least partly applied when the handle is moved from a position on one side of the centre zone to a position within the centre zone.

During movements of the handle outside the centre zone, the speed may be important, and a slow down may be annoying or even dangerous, and the system may therefore be adapted to select the fast down-ramp speed of the controlled element for such movements of the handle. When the controlled element is moved from a position on one side of the neutral area to a position within the neutral area, the slow down-ramp speed may be applied subsequent to the appliance of the fast down-ramp speed.

Since jerks often appear when the operator releases the handle, the slow down-ramp speed may be applied at a point in time when the controlled element arrives at the neutral area, thus avoiding jerks. On the contrary, the fast down-ramp speed may be applied when the controlled element is moved away from the neutral position.

When the operator wants to stop the movement of the controlled element, jerks may be avoided if the movement is slowed down before it is stopped completely. Thus, the slow down-ramp speed may be applied, when the controlled element is moved in the neutral area towards the neutral position upon a movement of the handle from a position on one side of the centre zone to a position within the centre zone.

When the controlled element is moved in the neutral area towards the neutral position upon a movement of the handle from a position on one side of the centre zone to a position on the opposite side of the centre zone, the fast down-ramp speed may be applied, since movements of the handle between opposite sides of the centre zone indicates that the operator e.g. finds that a quick change of direction is necessary or requires active control of the mobile machine without a delay.

The steering unit may be adapted to control the movement of the controlled element in accordance with a speed profile which expresses a ratio between a speed of the controlled element and a speed of the handle. Two different ratios may be applied for the fast and the slow down-ramp speed. The ratio between the speed of the controlled element and the speed of the handle may be directly proportional.

BRIEF DESCRIPTION OF THE DRAWING

In the following, an embodiment of the invention will be described in further details with reference to the drawing in which.

DETAILED DESCRIPTION OF THE PREFERRED EMBODIMENT

Figure 1:
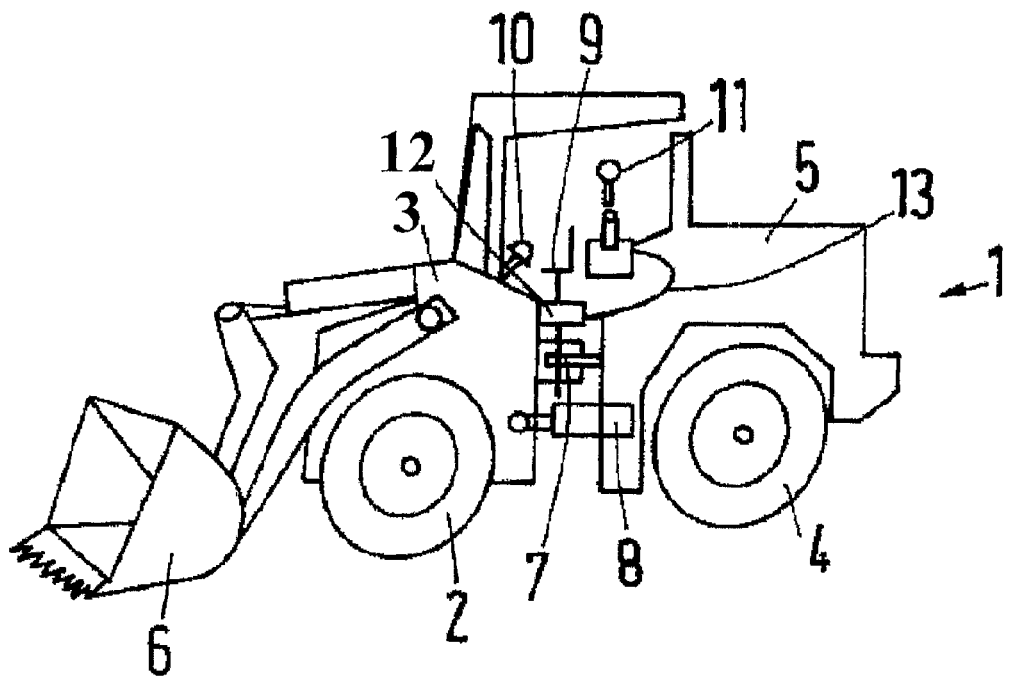
FIG. 1 shows a vehicle.

FIG. 1 shows a mobile machine 1 in the form of a front-end loader or a shovel loader 1. The front wheels 2 of the loader 1 are arranged on a front part 3 and the rear wheels 4 are arranged on a rear part 5. A shovel 6 is arranged on the front part and the rear part 5 carries a motor (not shown). Front and rear parts 3, 5 are connected by a hinge joint 7 which is located approximately in the middle of the front-end loader 1 and which enables rotation of the front part 3 relative to the rear part 5. The rotation is forced by a hydraulic cylinder 8. In general, the disclosed vehicle is referred to as an articulated vehicle 1. In an articulated vehicle 1 in which the driver's seat 9 is arranged above the joint 7, the driver is exposed to sideward acceleration each time the front part 3 is moved relative to the rear part 5. Such a change of acceleration, often called jerk, may be uncomfortable for the driver.

A driver sitting in the driver's seat 9 can operate a handle, e.g. a steering wheel and thereby a steering column 10 or a joystick 11 to steer the vehicle 1. The corresponding control signals are processed in a control unit 12 which is shown schematically in FIG. 2. In order to enable the processing, an electrical connection 13 is provided between the joystick 11 and the control unit 12. A hydraulic connection 14 serves the purpose of transmitting hydraulic signals from the handle 10 to the control unit 12.

Figure 2:
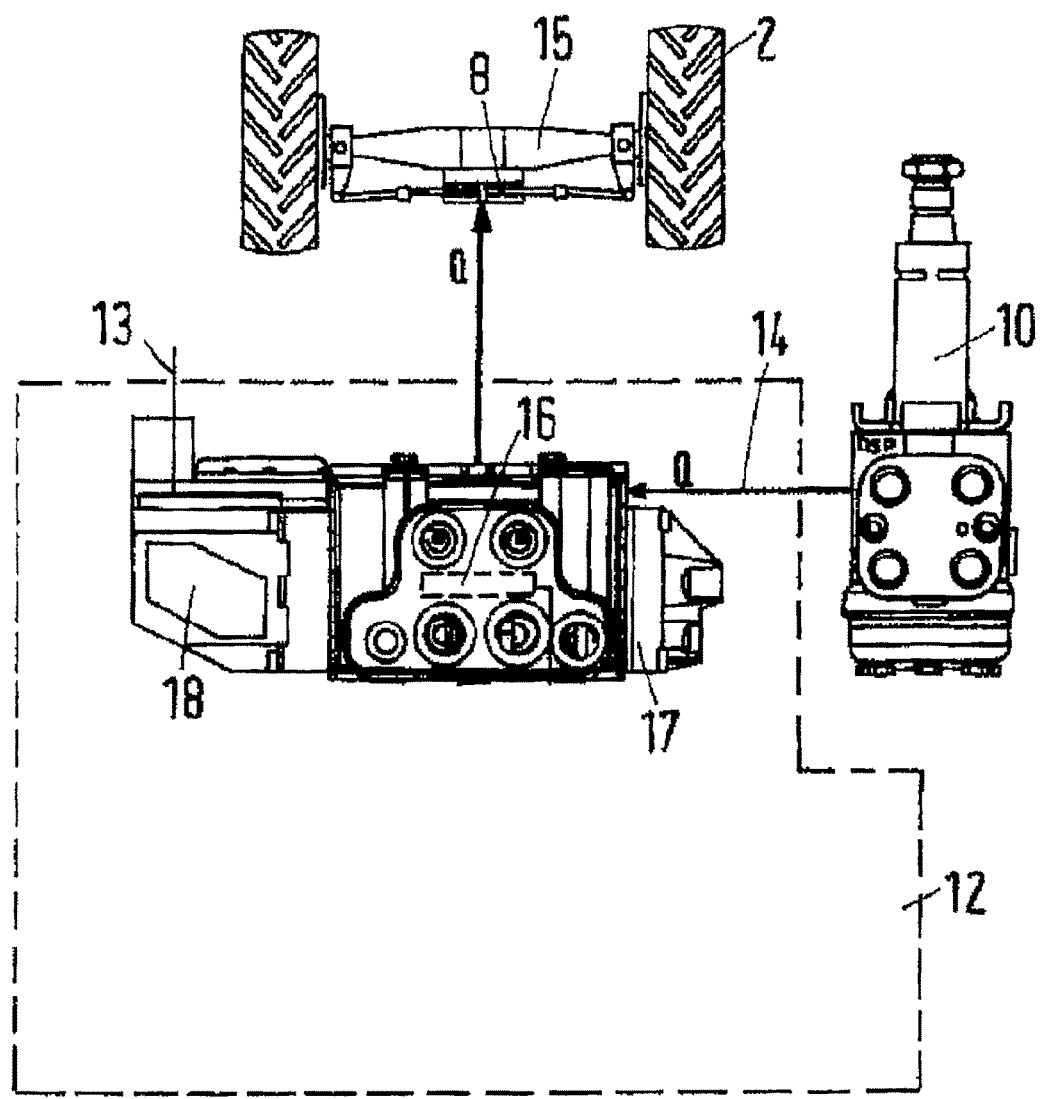
FIG. 2 shows a steering device.

FIG. 2 shows a simplified steering, in which only the front wheels 2 are steered on a shaft 15. However, the steering system according to the invention is also applicable for a more advanced steering, such as a steering of an articulated vehicle 1 as shown in FIG. 1.

In an articulated vehicle 1, a steering causes the two vehicle parts 3, 5 to rotate relative to each other. The cylinder 8 receives hydraulic fluid under pressure causing its piston rod to move in or out. The supply of hydraulic fluid is substantially determined by a valve which is communicating with, or forms part of the control unit 12. In the embodiment shown in FIG. 2, the valve element 16, i.e. a spool, can be moved via the hydraulic connection 14 which transmits a hydraulic steering signal from the handle 10 to the valve to move the spool inside a housing 17 of the valve. The spool may alternatively be moved electrically via an electric actuator 18 which receives signals from the joystick 11 via the electrical connection 13, c.f. FIG. 1.

To prevent jerks, or at least to reduce it so much that the driver does no longer find it disturbing, the movement of the valve element 16 is controlled. Or rather, its movement speed is limited, so that, for example, an oil flow (or the flow of another hydraulic fluid) into the cylinder 8 can only decrease by a predetermined speed, i.e. a slow down-ramp speed. Thus, an instantaneous blocking of the movement of the cylinder 8 and an abrupt end of the steering movement can be prevented.

When the valve element 16 is controlled electrically via the joystick 11, i.e. via the electric actuator 18, an inadmissible jerk can be suppressed by adequate control of the speed of a spool in the valve element 16. The valve element 16 may also be controlled hydraulically by means of the steering wheel via the steering column 10 via the hydraulic connection 14.

Jerk may in particularly appear, when the driver finishes the steering by releasing the handle 10, 11 which thereby rapidly returns to the centre zone. If the controlled element would have been moved at the fast down-ramp speed it might have caused oscillation in the steering system of the vehicle 1 and the driver may experience unpleasant jerks. By limiting the speed of the controlled element, in this case the valve element 16, the jerks may be reduced or avoided.

However, it may happen that such a jerk limitation has a negative influence on the controllability of the vehicle 1. One solution is to make the movement speed of the valve element 16 dependent on the travel speed of the vehicle 1, e.g. so that at higher travel speed results in a high speed of the valve element 16. A speed sensor may be provided, which is connected with a corresponding control device responsible for the control of the speed of the valve element 16.

In a similar way, the total weight of the vehicle 1 may influence the jerk. In one embodiment, the movement speed of the valve element 16 may be reduced with increasing weight of the vehicle 1. The vehicle 1 may therefore comprise sensing means, e.g. for determining the weight of the vehicle 1 or the weight of the load of the shovel 6.

A seat sensor may determine the distance of the driver's seat 9 and thus the driver from the joint 7. The larger the distance is, the smaller is the negative influence of the jerk, and the speed of the valve element 16 may be increased.

Finally, a driver may indicate personally desired characteristics concerning jerks and thereby concerning the control of the speed of the valve element 16 via input means, e.g. comprising a bar code reader, a keyboard, or a magnetic card reader.

Figure 3:
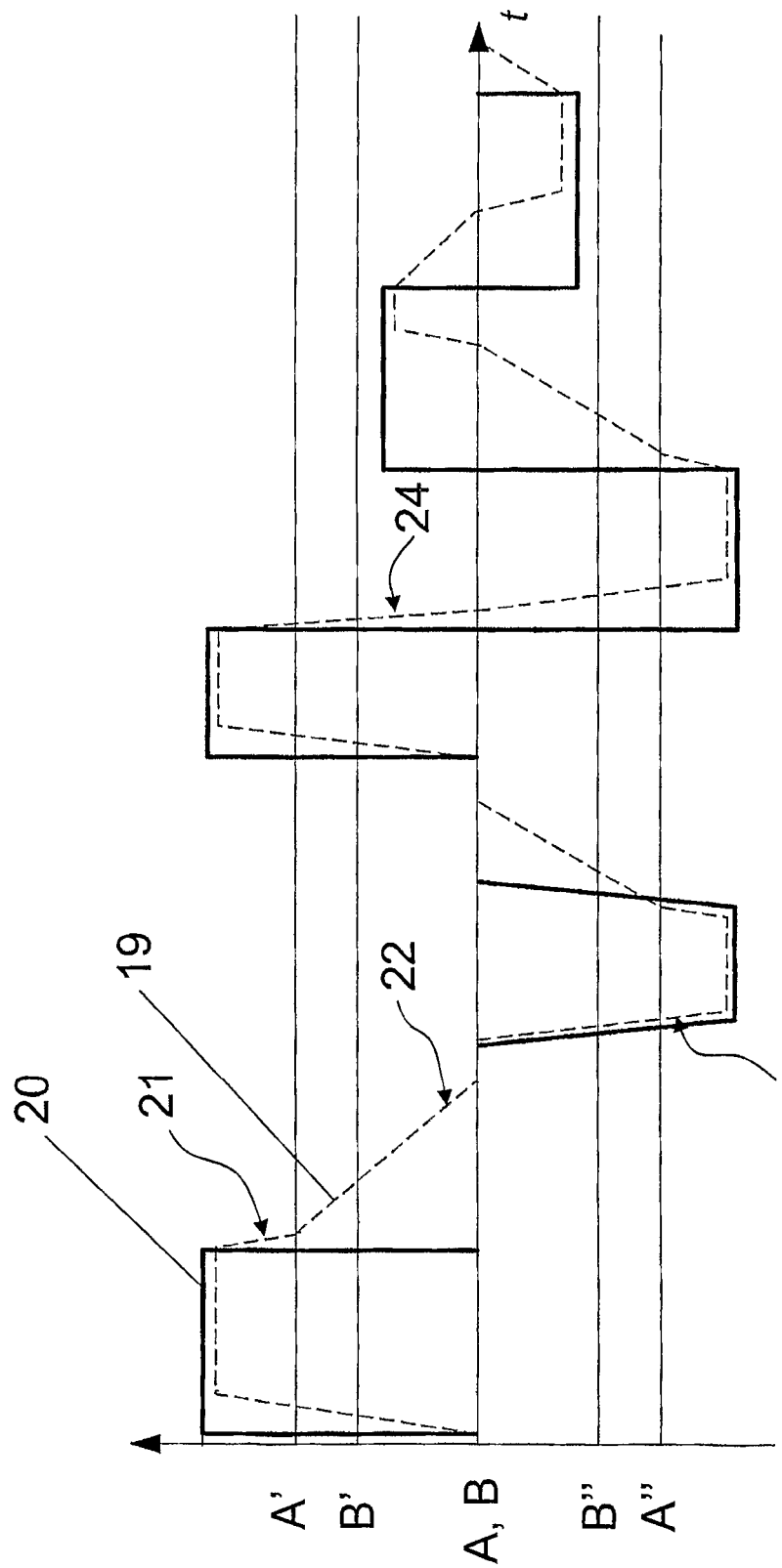

FIG. 3 shows a schematic profile of the movement of the controlled element 16 compared to the movement of the handle 10, 11. The controlled element 16, i.e. in this embodiment the valve element 16, is movable in and on opposite sides of a neutral area. The neutral area is indicated as the area between A' and A". The neutral area comprises a neutral position which is indicated by an A. The dotted line 19 shows the movement of the controlled element 16.

The handle 10, 11 is movable between set-points in and on opposite sides of a centre zone. The centre zone is indicated as the zone between B' and B". The centre zone comprises a centre set-point which is indicated by a B. The full-drawn line 20 shows the movement of the handle 10, 11.

As shown in FIG. 3, a time delay between the movement of the handle 10, 11 and the movement of the controlled element 16 occurs in the steering system. When the controlled element 16 is moved at the fast down-ramp speed (indicated by the inclination pointed at by the arrow 21), there is only a minor time delay between the movement of the controlled element 16 and the movement of the handle 10, 11. This minor time delay is caused by mechanical inertia, tolerances, viscosity of the hydraulic fluid, or caused by a pre-set time-delay chosen in the system. When the controlled element 16 is moved at the slow down-ramp speed (indicated by the inclination pointed at by the arrow 22), the controlled element 16 is moved with a larger time delay compared to the movement of handle 10, 11. Thus, the controlled element 16 will slowly return to the neutral position A.

When moving the handle 10, 11 away from the centre set-point B, the driver indicates a desired change of direction or requires active control of the vehicle 1. In this case, the fast down-ramp speed pointed at by arrow 24 is applied.

Since jerks often appear, when the driver finishes the steering and releases the handle 10, 11 whereby the handle rapidly returns to the centre zone, the slow down-ramp speed is applied at a point in time when the controlled element 16 arrives at the neutral area at A' or A" from outside the neutral area.

When the controlled element moves away from the neutral position A, the up-ramp speed in applied (indicated by the inclination pointed at by the arrow 23).

By using a speed which depends on received set-points, the steering is optimised and an annoying and unnecessary slow down of the steering speed as well as annoying and unnecessary jerks may be reduced or avoided.

Figure 4:
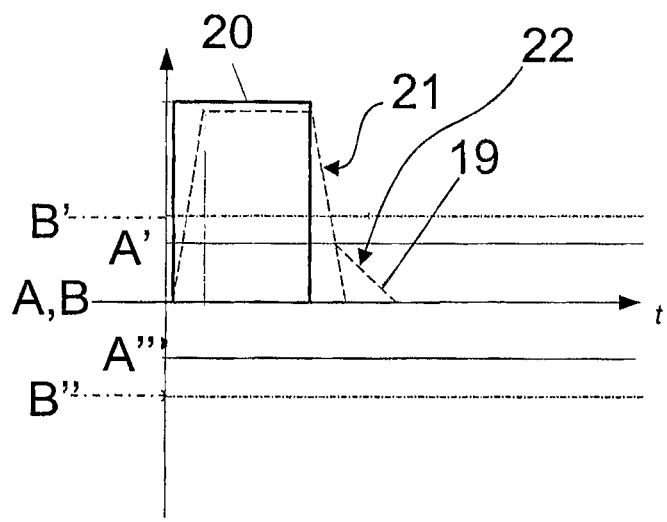
FIGS. 3 and 4 show schematic profiles of the movement of the controlled element compared to the movement of the handle.

FIG. 4 shows an alternative profile of the movement in which again the controlled element 16 is movable in and on opposite sides of a neutral area indicated as the area between A' and A". The neutral area comprises a neutral position which is indicated by an A. The dotted line 19 shows the movement of the controlled element 16, and as indicated, the fast-down ramp speed exist for a longer time compared with the situation in FIG. 3, and the controlled element therefore reaches the neutral position faster, while the driver still has the same comfortable and jerk-less ride.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A steering system comprising:
    a controlled element which is movable in a neutral area and in areas on opposite sides outside of the neutral area based on a steering input, the neutral area comprising an area between a first position and a second position, the first position being on an opposite side of a neutral position than the second position;
    a handle for controlling the position of the controlled element, the handle being movable between set-points in a centre zone corresponding to the controlled element's neutral area, the centre zone comprising an area between a first set-point and a second set-point, the first set-point being on an opposite side of a centre set-point than the second set-point; and
    a steering unit arranged to receive set-points from the handle, and to move the controlled element to a corresponding position, the steering unit selecting between a fast down-ramp speed and a slow down-ramp speed by which the controlled element is moved in the neutral area towards the neutral position,
    wherein when the handle is moved on opposite sides outside of the centre zone toward the centre set-point, the steering unit controls the controlled element to move on opposite sides outside of the neutral area toward the neutral position at the fast down-ramp speed,
    wherein when the handle is moved in the centre zone to the centre set-point, the steering unit controls the controlled element to move in the neutral area to the neutral position at the slow down-ramp speed; and
    wherein when the handle is moved from a position on one side outside of the centre zone to a position on the opposite side outside of the centre zone, the steering unit controls the controlled element to move through the neutral area at a constant fast ramp-down speed; and
    wherein the slow down-ramp speed is slower than the fast down-ramp speed.

2. The steering system according to claim 1, wherein the speed is based on two consecutively received set-points.

3. The steering system according to claim 1, wherein steering unit is adapted to select an up-ramp speed by which the controlled element is moved away from the neutral position.

4. The steering system according to claim 1, further comprising a valve with a housing defining an inlet port connectable to a source of fluid and first and second ports connectable to first and second ports of a pressure operated device, the valve comprising a spool which is movable between valve positions in the housing to provide a variable fluid flow from the source to one of the first and second ports of the device.

5. The system according to claim 4, wherein the pressure operated device moves the controlled element in a first direction based on a fluid flow in a first control port, and in a second direction based on a fluid flow in a second control port.

6. The steering system according to claim 4, wherein the controlled element is constituted by the spool.

7. The system according to claim 5, wherein the slow down-ramp speed is applied subsequent to the appliance of the fast down-ramp speed when the controlled element is moved from a position on one side outside of the neutral area to a position within the neutral area.

8. The system according to claim 7, wherein the slow down-ramp speed is applied at a point in time when the controlled element arrives at the neutral area.

9. The system according to claim 5, wherein an up-ramp speed is applied when the controlled element is moved away from the neutral position.

10. The system according to claim 5, wherein the slow down-ramp speed is applied when the controlled element is moved in the neutral area towards the neutral position upon a movement of the handle from a position on one side outside of the centre zone to a position within the centre zone.

11. The system according to claim 1, wherein the steering unit is adapted to control the movement of the controlled element in accordance with a speed profile which expresses a ratio between a speed of the controlled element and a speed of the handle.

* * * * *